Sept. 8, 1959  TOSHITSUNE FUJITA  2,903,389
METHOD OF MOLDING REINFORCED PLASTICS
Filed June 5, 1957
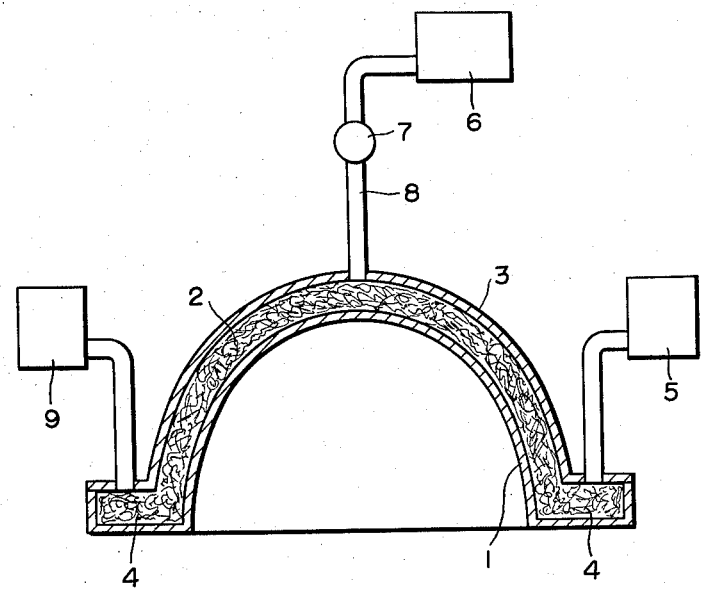

United States Patent Office 2,903,389
Patented Sept. 8, 1959

---

2,903,389

METHOD OF MOLDING REINFORCED PLASTICS

Toshitsune Fujita, Tokyo, Japan

Application June 5, 1957, Serial No. 663,660

Claims priority, application Japan August 3, 1956

4 Claims. (Cl. 154—110)

---

This invention relates to a method of molding void free reinforced plastics and it relates more particularly to the resin injection molding method of void free reinforced plastics having glass fibers therein for reinforcement and polyester resin as basic plastic materials, by applying evacuation, by applying pressure, or by a combination of the two. Conventional method of resin injection molding consists of placing the dry reinforcing material, e.g. glass fibre, between two stable and mating molds, and forcing catalysed and accelerated liquid polyester resin through the space between the mold inner surfaces by evacuating this space, by applying compressed air pressure to the resin reservoir, or by a combination of the two.

The fundamental necessity for rigorous consistency in a reinforced plastic molding is that the resin shall thoroughly wet the glass fibre and shall be void free.

In applications to aircraft structure and another same purposes, rigorous consistency must be fundamental factor to the reinforced plastic molding. The wetting problem depend partially on the "finish" of glass fibre, and there are many excellent finish: methacrylate chromic chloride, vinyltrimethylcellosolvesilane, vinyltrialkoxysilane, and the reaction product of alkyltrichlorosilane and resorcinol.

But even with that finishing material, the necessity for freedom from air bubbles is non-the-less of first important.

In view of our experience, it is very difficult problem to produce the complete void free impregnation, because the polyester resins are rather viscous and there are many spaces between inner surfaces of molds and glass fibre strands, between each glass fiber strands and between each glass mono-filaments, and moreover these spaces have different sizes to each other, therefore viscous resin tends to selectively pass through larger spaces between glass fiber strands than narrower spaces as between each glass mono-filaments, and also the flows of resin often tend to select special limited routes by the influences of high viscosity of resin, small partial differences of flow resistance, surface tension, capillary attraction and gravity effect, when resin injection is proceeding.

As the result of above phenomenon, frequently considerable amounts of air are captured and left behind within molding item.

According to our experience, when once this captured air bubbles have occurred within molding item, it is almost impossible to eliminate or remove this air bubbles from molding, without conveying and draining of very large amounts of excess resin through space of molding.

It is one of improved method recently recommended that the catalysed resin is firstly conveyed to the molding space, which is loaded with glass fiber for reinforcement, after thorough washing with this catalysed resin, the catalysed and accelerated resin is then passed to the air-free molding space, and then resin is cured.

It should be noted that only catalysed resin is recoverable, having regard to its considerable long pot life, but catalysed and accelerated resin is not.

In this process, the both resins are so highly viscous that satisfactory displacement of the air contained between glass fibers with resins is not completed, and moreover considerable amounts of excess resin is needed, molding period is prolonged on account of double resin injection procedure, and still we can not invariably expect complete void free molding item, according to captured air bubbles.

Anyhow, the difficulty of producing perfect void free reinforced plastics is due to the difficulty of the direct substitution of the air which is contained in mold space with viscous polyester resin itself.

With the above in view, it is an object of the present invention to provide a new method of the manufacture of good quality void free reinforced plastic moldings with polyester resin and glass fiber as reinforcement.

Another object of the present invention is to provide a method of the manufacture of void free reinforced plastic moldings with polyester resin and glass fiber as reinforcement, which is readily operated and without fail for even the unskilled.

A further object is to provide a method of economical production of considerable large size molding items, for examples, boat hull, automobile body and radome, without expensive huge hydraulic press.

The present invention will be illustrated by referring the accompanying drawing which shows a schematic view of the apparatus to favorably carry out the present method.

According to the present invention, a liquid or gaseous vinyl monomers which are reactive with the unsaturated polyester resins is injected to a mold enclosing glass fibers resulting in substitution of air in the mold with the liquid or gaseous vinyl monomer, and then the polyester resins are injected. Referring to the drawing, glass fibers 2 are put on a male mold 1 on which female mold 3 is mounted. Cock 7 of suction means 6 is opened and air between the molds 1 and 3 is exhausted while liquid or gaseous vinyl monomers which are reactive with unsaturated polyester resins are fed from a vessel 9 to interval 4 in bottom edge part of the male mold 1. Thus the all air contained between the molds is exchanged with liquid or gaseous vinyl monomer completely. Then, the unsaturated polyester resins are conveyed from a vessel 5 to interval 4, and suction is conducted on. When the polyester resins fill up the mold and appear at glass tube 8 which connects to the mold with suction means, cock 7 is closed. Then the polyester resins are cured at room temperature or elevated temperature.

Suction means 6 may be replaced by pressing means, if resins are injected into the molds by pressing means, it is recommended that 10–25 lb./sq. inch pressure of compressed air is used.

Vinyl compounds which is employed for substitution are reactive with the unsaturated polyester resins by the existence of catalyzer. Examples of those compounds are normally in the form of gas, such vinyl monomers as vinyl chloride, propylene and isobutylene; and normally in the form of liquid having low viscosity and high penetration property such vinyl monomers as vinyl acetate, methyl methacrylate, ethyl methacrylate, methyl acrylate, ethyl acrylate, acrylonitrile, styrene, vinyltoluene and vinylidene chloride. Mixtures of the monomeric vinyl compounds may also be employed, although in such case both need to be either gas or liquid. Mixtures of vinyl chloride-styrene, vinyl chloride-vinyl acetate and propylone-isobutylene are preferable.

These compounds can readily and completely substitute air in any fine clearance between glass monofilaments and other any spaces, according to their low viscosity and good penetration properties, and also can be completely substituted with the unsaturated polyester resin.

When and if the vinyl monomer which is used for substitution of air is captured in the fine clearances between the glass monofilaments and left behind in the injected polyester resins, the monomer reacts smoothly with the injected polyester resins in the presence of the resin catalyzer and forms cross-linking with unsaturated parts of injected polyester resins to form a superior quality-void free reinforced plastic material article.

I claim:

1. A method of producing a reinforced molded article which comprises flowing monomeric vinyl compound in the form of fluid under pressure into a mold which has been packed with glass fibers while air in the mold is taken off until it is completely replaced by the vinyl compound, flowing unsaturated polyester resin into the mold under pressure to fill the mold therewith while the vinyl compound is driven off, curing the resin in its place and removing the cured product from the mold.

2. A method of producing a reinforced molded article which comprises passing monomeric vinyl compound in the form of gas at room temperature under pressure into a mold which has been packed with glass fibers, removing air from the mold until the air is completely replaced by the vinyl compound, flowing unsaturated polyester resin into the mold under pressure to fill the mold therewith while the vinyl compound is driven off, curing the resin in its place and removing the cured product from the mold.

3. A method according to claim 2 wherein the vinyl monomer is selected from the group consisting of vinyl chloride and propylene.

4. A method of producing a reinforced molded article which comprises passing a monomeric vinyl compound having low viscosity into a mold under pressure, the mold having previously been packed with glass fibers, removing air from the mold until the air is completely replaced by the vinyl compound, flowing unsaturated polyester resin into the mold under pressure while the vinyl compound is driven off, and curing the resin in the mold.

References Cited in the file of this patent

UNITED STATES PATENTS

| | | |
|---|---|---|
| 2,038,627 | Badger | Apr. 28, 1936 |
| 2,105,567 | Webb | Jan. 18, 1939 |
| 2,304,461 | Krowles | Dec. 8, 1942 |
| 2,346,228 | Merrill et al. | Apr. 11, 1944 |
| 2,495,640 | Muskat | Jan. 24, 1950 |

FOREIGN PATENTS

| | | |
|---|---|---|
| 202,671 | Australia | July 19, 1956 |